United States Patent
Hunt et al.

(10) Patent No.: US 12,310,287 B2
(45) Date of Patent: May 27, 2025

(54) AGRICULTURAL SYSTEM AND METHOD FOR MONITORING FEEDER THROUGHPUT OF A HARVESTER

(71) Applicants: CNH Industrial America LLC, New Holland, PA (US); CNH Industrial Belgium N.V., Zedelgem (BE)

(72) Inventors: Cory Douglas Hunt, Millersville, PA (US); Bart M. A. Missotten, Herent (BE); Lucas Deruyter, Gits (BE); Dré W. J. Jongmans, Klundert (NL); Bert Vandewalle, Torhout (BE)

(73) Assignees: CNH Industrial America LLC, New Holland, PA (US); CNH Industrial Belgium N.V., Zedelgem (BE)

( * ) Notice: Subject to any disclaimer, the term of this patent is extended or adjusted under 35 U.S.C. 154(b) by 308 days.

(21) Appl. No.: 18/104,957

(22) Filed: Feb. 2, 2023

(65) Prior Publication Data

US 2024/0260509 A1 Aug. 8, 2024

(51) Int. Cl.
*A01D 41/127* (2006.01)
*G01C 21/00* (2006.01)

(52) U.S. Cl.
CPC ..... *A01D 41/1278* (2013.01); *A01D 41/1271* (2013.01); *G01C 21/3807* (2020.08); *G01C 21/3848* (2020.08)

(58) Field of Classification Search
CPC .................................................. A01D 61/008
See application file for complete search history.

(56) References Cited

U.S. PATENT DOCUMENTS

| 6,119,442 | A | 9/2000 | Hale |
| 8,010,261 | B2 * | 8/2011 | Brubaker ........... A01D 41/1278 |
| | | | 701/1 |
| 8,635,840 | B2 | 1/2014 | Behnke |

(Continued)

FOREIGN PATENT DOCUMENTS

| DE | 102011017620 A1 | 10/2012 |
| EP | 2143316 | 3/2019 |

(Continued)

OTHER PUBLICATIONS

European Search Report issued in corresponding Application No. EP 24155389.0 Dated Jul. 1, 2024 (10 pages).

*Primary Examiner* — Charles J Han
(74) *Attorney, Agent, or Firm* — Peter K. Zacharias; Rebecca L. Henkel; Rickard K. DeMille (57) ABSTRACT

An agricultural system for monitoring throughput of a feeder configured for use with a harvester performing a harvesting operation within a field may include a feeder housing and a feed assembly configured to direct a first flow of harvested materials and a second flow of harvested materials through the feeder. The agricultural system may further include a first sensor configured to generate first data indicative of the first flow of harvested materials through a first lateral section of the feeder. Similarly, the agricultural system may include a second sensor configured to generate second data indicative of the second flow of harvested materials through a second lateral section of the feeder. Additionally, the agricultural system may include a computing system configured to determine whether the harvester is on-row based at least in part on the first data and the second data.

19 Claims, 5 Drawing Sheets

(56) References Cited

U.S. PATENT DOCUMENTS

| | | | |
|---|---|---|---|
| 8,954,224 | B2 | 2/2015 | Behnke et al. |
| 9,539,618 | B2 | 1/2017 | Alley et al. |
| 9,648,807 | B2 | 5/2017 | Escher et al. |
| 9,928,606 | B2 | 3/2018 | Roth et al. |
| 10,412,889 | B2 | 9/2019 | Palla et al. |
| 11,197,417 | B2 | 12/2021 | Corban et al. |
| 11,297,768 | B2 | 4/2022 | Schildroth et al. |
| 11,678,607 | B2 * | 6/2023 | Zielke .................. A01D 45/021 56/10.2 R |
| 2003/0004630 | A1 * | 1/2003 | Beck .................... A01D 41/127 701/50 |
| 2016/0000008 | A1 * | 1/2016 | Schøler .............. A01D 41/1272 56/10.2 R |
| 2019/0343048 | A1 * | 11/2019 | Farley .................. A01D 61/002 |
| 2020/0022309 | A1 * | 1/2020 | Fries .................... A01D 61/008 |
| 2021/0137006 | A1 | 5/2021 | Shearer et al. |
| 2022/0232770 | A1 * | 7/2022 | Yanke .................. A01D 41/127 |
| 2022/0386531 | A1 * | 12/2022 | Carlson .................. A01F 15/07 |
| 2023/0189690 | A1 * | 6/2023 | Friedlein ............ A01D 41/1278 702/2 |

FOREIGN PATENT DOCUMENTS

| | | | |
|---|---|---|---|
| EP | 3981244 | A1 | 4/2022 |
| EP | 4356711 | A1 | 4/2024 |

* cited by examiner

AGRICULTURAL SYSTEM AND METHOD FOR MONITORING FEEDER THROUGHPUT OF A HARVESTER

FIELD OF THE INVENTION

The present disclosure relates generally to agricultural harvesters and, more particularly, to agricultural systems and methods for monitoring throughput of a feeder configured for use with an agricultural harvester.

BACKGROUND OF THE INVENTION

A harvester is an agricultural machine that is used to harvest and process crops. For instance, a forage harvester may be used to cut and comminute silage crops, such as grass and corn. Similarly, a combine harvester may be used to harvest grain crops, such as wheat, oats, rye, barley, corn, soybeans, and flax or linseed. In general, the objective is to complete several processes, which traditionally were distinct, in one pass of the machine over a particular part of the field. In this regard, most harvesters are equipped with a harvesting implement, such as a header, which cuts and collects the crop from the field and feeds it to the base harvester for further processing. The harvester also includes a crop processing system, which performs various processing operations (e.g., threshing, separating, cleaning, etc.) of the harvested crop received from the harvesting implement.

Typically, the settings of the crop processing system are controlled based on a yield estimate generated after the crop has been at least partially processed by the crop processing system. However, if there is a sudden increase in the crop being received from the header, the crop processing system may not be able to adjust quickly enough to properly process the increased amount of crop, which may cause crop losses to occur. Similarly, if there is a sudden drop in the crop being received from the header, the crop processing system may not be cleaning the crop as aggressively as it could, which generally lowers the cleaning efficiency of the harvester, or the processing speed may be lower than necessary, which means that the harvesting operation takes longer than necessary.

Accordingly, an agricultural system and method for monitoring throughput of a feeder configured for use with an agricultural harvester would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an agricultural system for monitoring throughput of a feeder configured for use with a harvester performing a harvesting operation within a field. The agricultural system may include a feeder housing and a feed assembly supported within the feeder housing, with the feed assembly being configured to direct a first flow of harvested materials and a second flow of harvested materials through the feeder. The agricultural system may further include a first sensor configured to generate first data indicative of the first flow of harvested materials through a first lateral section of the feeder. Similarly, the agricultural system may include a second sensor configured to generate second data indicative of the second flow of harvested materials through a second lateral section of the feeder, the second lateral section of the feeder being at least partially separate from the first lateral section of the feeder. Additionally, the agricultural system may include a computing system communicatively coupled to the first sensor and the second sensor, with the computing system being configured to receive the first data and the second data, and to determine whether the harvester is on-row based at least in part on the first data and the second data.

In another aspect, the present subject matter is directed to an agricultural method for monitoring throughput of a feeder configured for use with a harvester performing a harvesting operation within a field, where the feeder has a feeder housing and a feed assembly supported within the feeder housing. The agricultural method may include controlling the feed assembly to direct a first flow of harvested materials through a first lateral section of the feeder and a second flow of harvested materials through a second lateral section of the feeder, where the second lateral section is at least partially separate from the first lateral section along a lateral direction. Further, the agricultural method may include receiving, with a computing system, first data generated by a first sensor having a field of view directed toward the first flow of harvested materials. Moreover, the agricultural method may include receiving, with the computing system, second data generated by a second sensor having a field of view directed toward the second flow of harvested materials. Additionally, the agricultural method may include determining, with the computing system, whether the harvester is on-row based at least in part on the first data and the second data.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to agricultural systems and methods for determining feeder throughput of a feeder of an agricultural harvester. Specifically, in several embodiments, the disclosed system includes a feeder of the agricultural harvester, where the feeder has a feeder housing and a feed assembly positioned within the feeder housing, with the feed assembly being configured to direct a flow of harvested materials through the feeder. For instance, the feed assembly may include a plurality of carriers (e.g., slats) spaced apart and drivable along a loop. Generally, the harvested materials may be pushed by the slats from a front end of the feeder to a rear end of the feeder as the slats are driven around the loop. Depending on the configuration of the header, the feeder may have two or more substantially distinct flows of harvested materials flowing through different lateral sections of the feeder. For instance, the feeder may have a first flow of harvested materials passing through a first lateral section of the feeder and a second flow of harvested materials passing through a second lateral section of the feeder.

If the header has a different width or row spacing compared to the planter previously used to plant the crops being harvested, it may be particularly difficult to steer the header to be on-row. Generally, the harvester is "on-row" when the row spacing across the header is aligned with the row spacing of crop being harvested so that the rows of crop pass through corresponding spaces of the header, such as between heads of a corn header. Conversely, the harvester is not on-row or is "off-row" when the row spacing along at least part of the harvester (e.g., of a lateral region of the header associated with a lateral section of the feeder) is not aligned with the row spacing in the field such that some of the crop does not pass through corresponding spaces of the header. When the harvester is off-row, a significantly higher volume of material-other-than-grain (MOG) may pass through the lateral section of the feeder corresponding to the region of the header not properly aligned with the rows of crop.

As such, one or more sensors may be used to generate data indicative of the different flows of harvested materials, which may in turn, be indicative of whether the harvester is on-row. For instance, a first sensor may be configured to generate data indicative of the first flow of harvested materials through the first lateral section of the feeder and a second sensor may be configured to generate data indicative of the second flow of harvested materials through the at least partially distinct, second lateral section of the feeder. A computing system of the disclosed system may be configured to monitor the data from the sensors to determine whether the harvester is "on-row" or "off-row." If the harvester is determined to be "off-row", the operator may be notified and/or an automatic adjustment (e.g., a steering correction and/or a header row spacing correction) may be performed to try to bring the harvester back to an on-row condition.

Accordingly, the disclosed system and methods may monitor the throughput of the feeder to determine when the harvester is on-row, which may improve the row guidance of the harvester and, thus, the overall performance of the harvesting operation.

Figure 1:
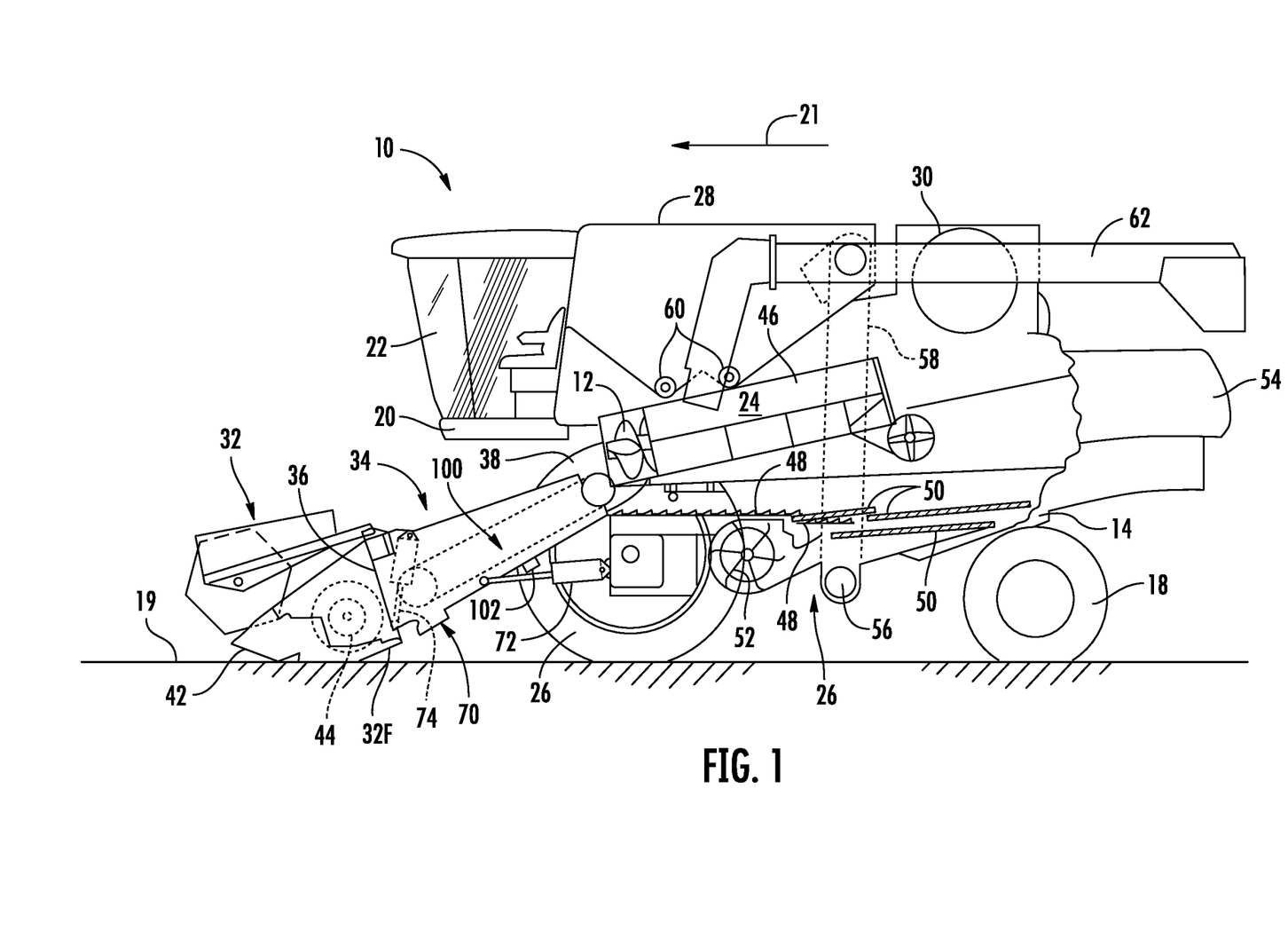
FIG. 1 illustrates a simplified, partial sectional side view of one embodiment of an agricultural harvester in accordance with aspects of the present subject matter.

Referring now to the drawings, FIG. 1 illustrates a simplified, partial sectional side view of one embodiment of a work vehicle, such as an agricultural harvester 10. The harvester 10 may be configured as an axial-flow type combine, wherein crop material is threshed and separated while it is advanced by and along a longitudinally arranged rotor 12. The harvester 10 may include a chassis or main frame 14 having a pair of driven, ground-engaging front wheels 16 and a pair of steerable rear wheels 18. The wheels 16, 18 may be configured to support the harvester 10 relative to a ground surface 19 and move the harvester 10 in a forward direction of movement (indicated by arrow 21 in FIG. 1) relative to the ground surface 19. Additionally, an operator's platform 20 with an operator's cab 22, a threshing and separating assembly 24, a grain cleaning assembly 26, and a holding tank 28 may be supported by the frame 14. As is generally understood, the harvester 10 may include an engine and a transmission mounted on the frame 14. The transmission may be operably coupled to the engine and may provide variably adjusted gear ratios for transferring engine power to the wheels 16, 18 via a drive axle assembly (or via axles if multiple drive axles are employed).

Moreover, as shown in FIG. 1, a harvesting implement (e.g., a header 32) and an associated feeder 34 may extend forward of the main frame 14 and may be pivotally secured thereto for generally vertical movement. In general, the feeder 34 may be configured to serve as a support structure for the header 32. As shown in FIG. 1, the feeder 34 may extend between a front end 36 coupled to the header 32 and a rear end 38 positioned adjacent to the threshing and separating assembly 24. As is generally understood, the rear end 38 of the feeder 34 may be pivotally coupled to a portion of the harvester 10 to allow the front end 36 of the feeder 34 and, thus, the header 32 to be moved upwardly and downwardly relative to the ground 19 to set the desired harvesting or cutting height for the header 32.

As the harvester 10 is propelled forwardly over a field with standing crop, the crop material is severed from the stubble by a sickle bar 42 at the front of the header 32 and delivered by a material transfer device 44 (e.g., a header auger, a header conveyor, etc.) to the front end 36 of the feeder 34, which supplies the cut crop to the threshing and separating assembly 24. However, it should be appreciated that the header 32 may have any other suitable configuration. For instance, as will be described below in greater detail, in some embodiments, the header 32 may have a plurality of heads instead of the sickle bar 42 for severing the standing crop from the stubble.

Figure 5:
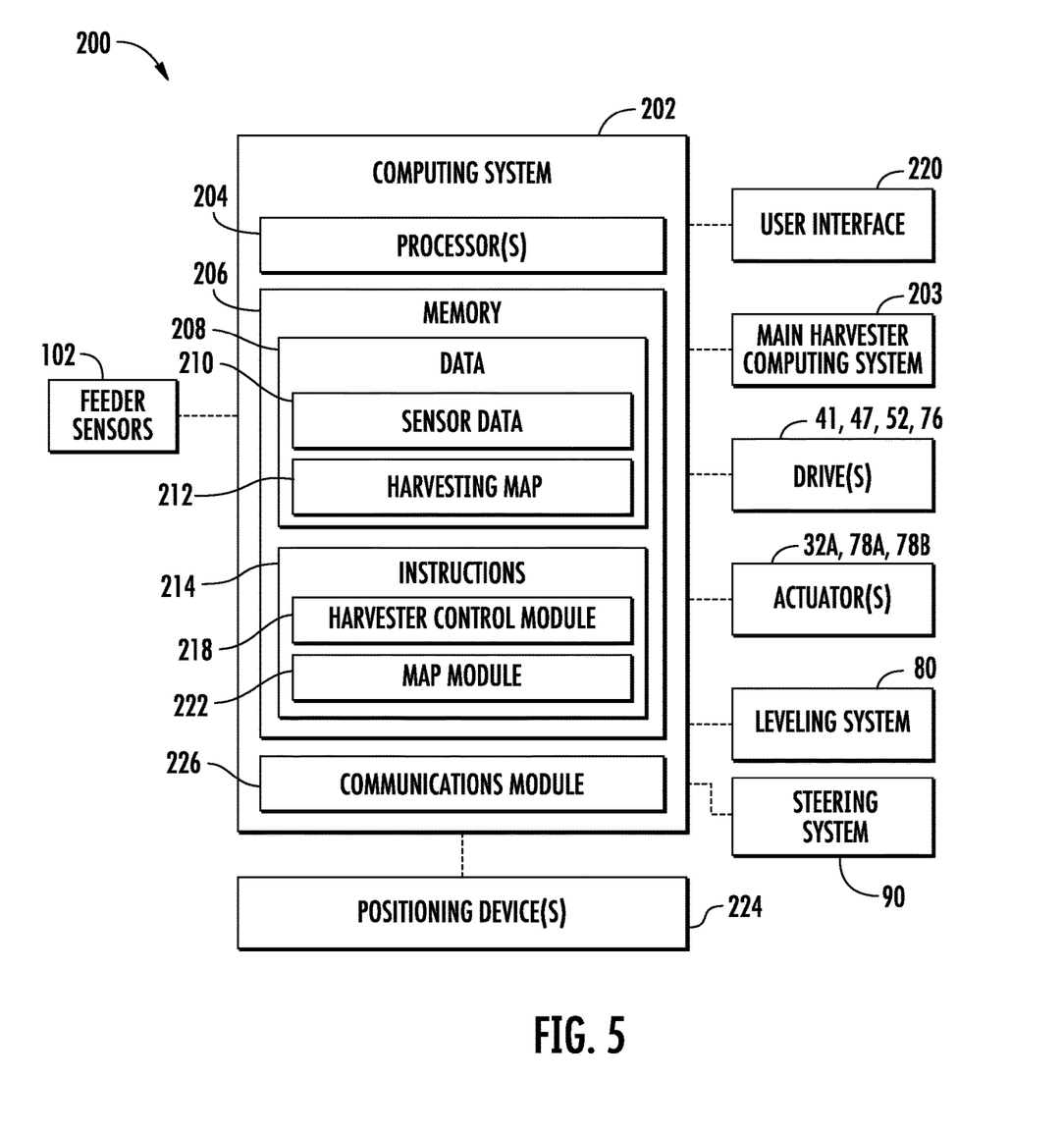
FIG. 5 illustrates a schematic view of a system for monitoring a throughput of a feeder for use with an agricultural harvester in accordance with aspects of the present subject matter.

As is generally understood, the threshing and separating assembly 24 may include a cylindrical chamber or concave rotor cage 46 (hereinafter referred to as "concave 46") in which the rotor 12 is rotated by a rotor drive 76 (FIG. 5) to thresh and separate the crop received therein. That is, the crop is rubbed and beaten between the rotor 12 and the inner surfaces of the concave 46, whereby the grain, seed, or the like, is loosened and separated from the straw or MOG. In some embodiments, a position of the concave 46 about the rotor axis (e.g., a distance from the rotor axis) may be adjustable by one or more first concave actuators 78A (FIG. 5) and/or an angle of vanes (not shown) within the concave 46 may be adjustable by one or more second concave actuators 78B (FIG. 5).

Crop material which has been separated by the threshing and separating assembly 24 falls onto a series of pans 48 and associated sieves 50, with the separated crop material being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the crop material. For instance, the fan 52 may blow the impurities off of the crop material for discharge from the harvester 10 through the outlet of a straw hood 54 positioned at the back end of the harvester 10. In some embodiments, a leveling system 80 (FIG. 5) may be provided for adjusting the lateral positioning of the cleaning assembly 48, 50. For instance, when the agricultural harvester 10 is on a hill such that one lateral side of the agricultural harvester 10 is positioned higher than its other lateral side, one or more actuators of the leveling system 80 may adjust the lateral positioning or angle of the pans 48 and/or the sieves 50 to counteract such sloping and keep the pans 48 and sieves 50 level.

The cleaned crop material passing through the sieves 50 may then fall into a trough of an auger 56, which may be configured to transfer the crop material to an elevator 58 for delivery to the associated holding tank 28. Additionally, a pair of tank augers 60 at the bottom of the holding tank 28 may be used to urge the cleaned crop material sideways to an unloading tube 62 for discharge from the harvester 10.

Moreover, in several embodiments, the harvester 10 may also include a hydraulic system 70 which is configured to adjust a height of the header 32 relative to the ground surface 19 so as to maintain the desired cutting height between the header 32 and the ground surface 19. The hydraulic system 70 may include a height actuator 72 (e.g., a fluid-actuated cylinder) configured to adjust the height or vertical positioning of the header 32 relative to the ground. For example, in some embodiments, the height actuator 72 may be coupled between the feeder 34 and the frame 14 such that the height actuator 72 may pivot the feeder 34 to raise and lower the header 32 relative to the ground 19. In addition, the hydraulic system 70 may include a tilt actuator(s) 74 (e.g., a fluid-actuated cylinder) coupled between the header 32 and the feeder 34 to allow the header 32 to be tilted relative to the ground surface 19 or pivoted laterally or side-to-side relative to the feeder 34.

Additionally, in accordance with aspects of the present subject matter and as will be described in greater detail below, a sensor assembly 100 may include one or more sensors 102 associated with the feeder 34, where each sensor 102 is configured to generate data indicative of the flow of harvested materials directed through the feeder 34 by a feed assembly 35, such as feeder throughput and/or the composition, distribution, quality, etc. of the flow of harvested materials. Using at least the feeder throughput of the harvested materials directed through the feeder 34, adjustment (s) may be made to the operation of the harvester 10 to reduce crop losses and improve efficiency of the crop processing operations.

Figure 2:
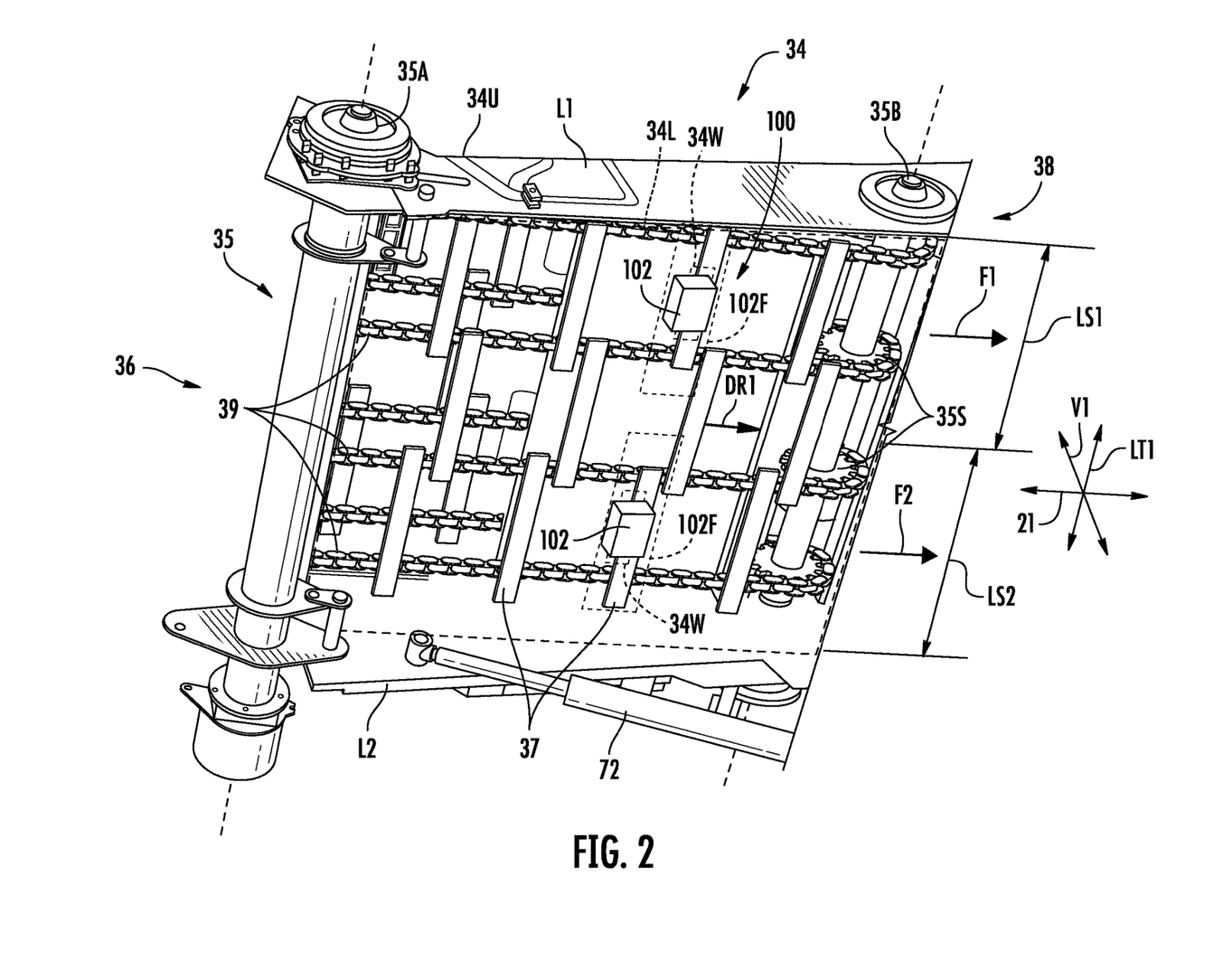
FIG. 2 illustrates a detail view of various components of a feeder of an agricultural harvester in accordance with aspects of the present subject matter, particularly illustrating a feed assembly within a feeder housing of the feeder, and a sensor assembly for monitoring a throughput of the feeder.

Referring now to FIG. 2, a detail view of various components of the feeder 34 of the agricultural harvester 10 is illustrated in accordance with aspects of the present subject matter, particularly illustrating the feed assembly 35 and the sensor assembly 100 associated with the feeder 34. As shown in FIG. 2, the feeder 34 has a housing that generally extends along the direction of travel 21 between the front end 36 and the rear end 38, along a lateral direction LT1, perpendicular to the direction of travel 21, between a first lateral side L1 and a second lateral side L2, and along a vertical direction V1, generally perpendicular to both the direction of travel 21 and the lateral direction LT1, between an upper wall 34U and a lower wall 34L (shown transparently). The feed assembly 35 is positioned at least partially within the feeder housing and includes drive members, including a first rotational shaft 35A and a second rotational shaft 35B. Each of the rotational shafts 35A, 35B generally extends along or parallel to the lateral direction LT1 and is rotatable about a respective rotational axis similarly extending along or parallel to the lateral direction LT1, with the rotational shafts 35A, 35B being spaced apart along the direction of travel 21.

Figure 3:
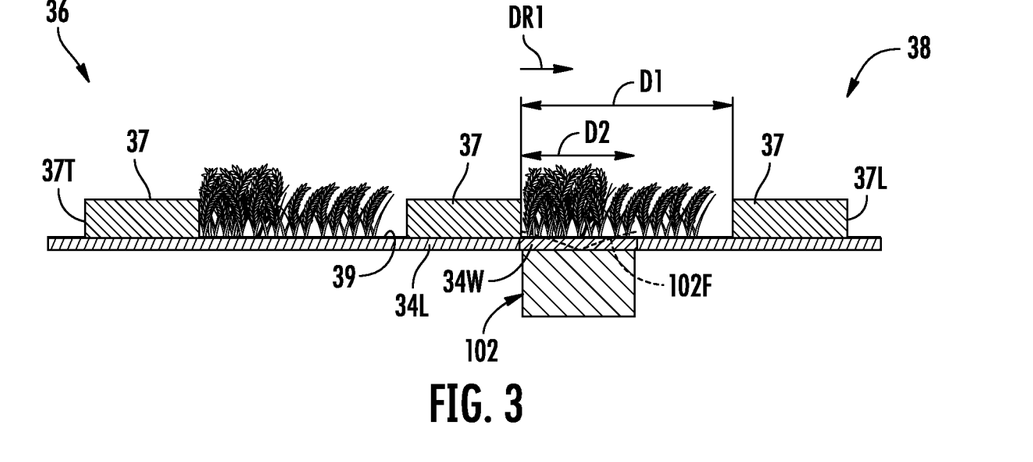
FIG. 3 illustrates a schematic, side view of the feeder assembly and the sensor assembly shown in FIG. 2 in accordance with aspects of the present subject matter, particularly illustrating the flow of harvested materials being directed by the feeder assembly relative to the sensor assembly.

The feed assembly 35 further includes a plurality of carriers 37, such as slats, configured to be driven about a continuous loop defined by chains 39 extending around sprockets 35S fixed to the rotational shafts 35A, 35B. The slats 37 are spaced apart along the chains 39 by a distance D1 (FIG. 3). The slats 37 collectively extend across substantially all of a lateral width of the feeder 34 in the lateral direction LT1. In some instances, each of the slats 37 only extends across a portion of the lateral width of the feeder 34 in the lateral direction LT1. For example, as shown in FIG. 2, each of the slats 37 extends across about one-third of the lateral width of the feeder 34 in the lateral direction LT1, with the slats 37 at least partially overlapping along the lateral direction LT1 such that the slats collectively extend across substantially all of the lateral width of the feeder 34. However, it should be appreciated that, in other embodiments, each of the slats 37 may extend across an entire lateral width of the feeder 34.

When the rotational shaft(s) 35A, 35B are driven to rotate (e.g., by shaft drive(s) 41 (FIG. 5)), the chains 39 are driven by the sprockets 35S fixed to the shafts 35A, 35B, which drives the slats 37 about the loop. Preferably, the rotational shafts 35A, 35B are driven such that the slats 37 closer to the lower wall 34L of the feeder move from the front end 36 of the feeder 34 towards the rear end 38 of the feeder 34 (e.g., as shown with arrow DR1, generally parallel to the direction of travel 21), while the slats 37 closer to the upper wall 34U of the feeder 34 move from the rear end 38 of the feeder 34 towards the front end 36 of the feeder. For instance, as shown in FIG. 3, as the slats 37 closest to the lower wall 34L of the feeder housing are driven by the chain 39 in the direction DR1, a leading side 37L of the slats 37 is positioned closer to the rear end 38 of the feeder 34 than a trailing side 37T of the slats 37, and flows of the harvested materials are pushed by the leading side 37L of the slats 37 along the lower wall 34L from the front end 36 of the feeder 34 to the rear end 38 of the feeder 34.

As indicated above, depending on the configuration of the header 32, the flow of harvested materials through the feeder 34 may include multiple substantially distinct flows of harvested materials flowing through different lateral sections of the feeder 34. For instance, the feeder 32 may have a first flow of harvested materials F1 passing through a first lateral section LS1 of the feeder 34 and a second flow of harvested materials F2 passing through a second lateral section LS2 of the feeder 34. As shown in FIG. 2, the first lateral section LS1 extends from the first lateral side L1 to an intermediate lateral location along the lateral direction LT1, while the second lateral section LS2 extends from the second lateral side L2 to the intermediate lateral location. It should be appreciated that, in some instances, the intermediate lateral location is a center of the feeder 34 along the lateral direction LT1. However, the intermediate lateral location may be any other suitable location along the lateral direction LT1. In one embodiment, the lateral sections LS1, LS2 do not overlap. However, it should be appreciated that, in other embodiments, the lateral sections LS1, LS2 may at least partially overlap. Additionally, it should be appreciated that in some embodiments, the lateral sections LS1, LS2 are spaced apart from each other along the lateral direction LT1.

In the illustrated embodiment, the sensor assembly 100 includes two sensors 102 for generating data indicative of the flows of harvested materials being moved through the feeder 34 by the feed assembly 35. In some embodiments, the sensors 102 are coupled to or otherwise supported on the lower wall 34L of the feeder 34, with the field of view 102F of each of the sensors 102 being directed generally upward along the vertical direction V1, from vertically below the feed assembly 35. For instance, in one embodiment, at least one window 34W is positioned within the lower wall 34L, with the sensors 102 being coupled to the lower wall 34L on an exterior of the feeder 34 such that the field of view 102F of each of the sensors 102 is directed through the window 34W, or through respective windows 34W, into the feeder 34. However, in other embodiments, the sensors 102 may be alternatively, or additionally, positioned at any other suitable location such that the field of view 102F of the sensors 102 are directed towards the flows of harvested materials F1, F2.

As illustrated, the field of view 102F of one of the sensors 102 is directed towards the first lateral section LS1 of the lateral width of the feeder 34, while the field of view 102F of the other of the sensors 102 is directed towards the second lateral section LS2 of the lateral width of the feeder 34. As such, the sensor 102 with the field of view 102F directed toward the first lateral section LS1 may be configured to generate data indicative of the first flow of harvested materials F1 through the first lateral section LS1 of the feeder 34, while the sensor 102 with the field of view 102F directed toward the second lateral section LS2 may be configured to generate data indicative of the second flow of harvested materials F2 through the second lateral section LS2. It should be appreciated that the field of view 102F of the sensors 102 may extend across the entire lateral width of the respective lateral section LS1, LS2, or only a portion thereof. The data generated by the sensors 102 may thus, also be indicative of a distribution of the flow of harvested materials across at least a portion of the lateral width of the feeder 34. In one embodiment, the field of view 102F of the sensors 102 may collectively extend across at least 50% of the lateral width of the feeder 34, such as at least 75% of the lateral width of the feeder, and/or the like. In some embodiments, the field of view 102F of the sensors 102 may collectively extend across the entire lateral width of the feeder 34.

The sensors 102 may be configured as any suitable sensors. For instance, in one embodiment, each of the sensors 102 may be configured as a non-contact sensor(s), including a vision-based sensor(s) (e.g., a camera(s), a light detection and ranging (lidar) device(s)/sensor(s), and/or a radio detection and ranging (radar) sensor(s)), such that the sensors 102 generates suitable data (e.g., image data, radar data, point-cloud data, infrared data, and/or the like) indicative of the amount of harvested materials directed through the feeder 34. It should be appreciated that, by having a separate sensor 102 for each flow of harvested materials F1, F2, the data may be easier to analyze. However, it should also be appreciated that, although two of the sensors 102 are shown in FIG. 2, any suitable number of the sensors 102 may instead be used. For instance, in one embodiment, one, three, four, or more of the sensor(s) 102 may be provided in association with the feeder 34. It should additionally be appreciated that the feeder 34 may have any other suitable feed assembly for directing the flow of crop materials through the feeder 34 instead of, or in addition to, the feed assembly 35, such as a conveyor belt, and/or the like.

As will be described below, a computing system of the disclosed system may be configured to monitor data generated by the sensors 102 indicative of the flows of harvested materials F1, F2 through the different lateral sections LS1, LS2 of the feeder 34. For instance, as indicated above, the computing system may be configured to monitor the data generated by the sensors 102 to determine whether the harvester 10 is on-row.

Figure 4A:
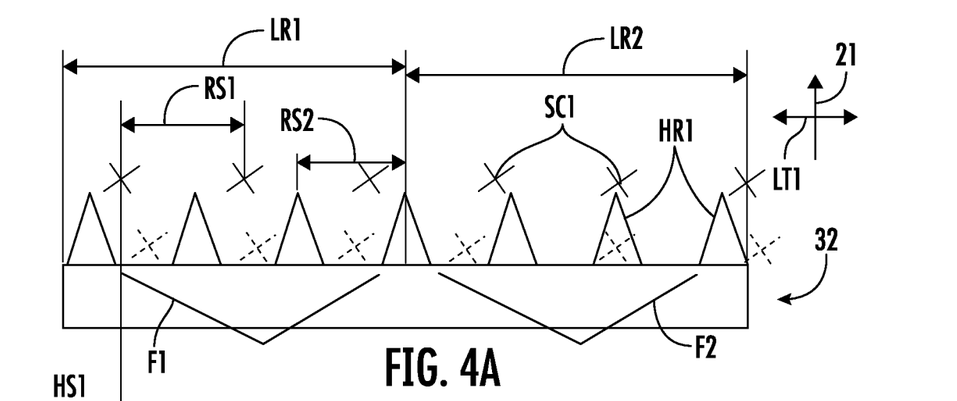
FIGS. 4A and 4B illustrate schematic top-down views of a header of an agricultural harvester in accordance with aspects of the present subject matter, particularly illustrating an off-row condition and an on-row condition, respectively.
Figure 4B:
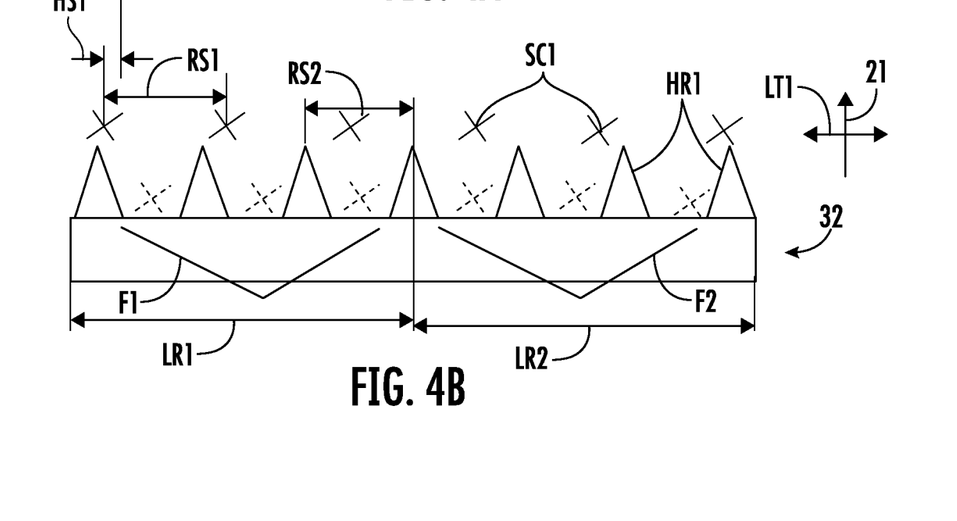

For example, referring to the schematic top down views of the header 32 shown in FIGS. 4A and 4B, a first lateral region LR1 of the header 32 is configured to generate the first flow of harvested materials F1 associated with the first lateral section LS1 of the feeder 34, while a second lateral region LR2 of the header 32 is configured to generate the second flow of harvested materials F2 associated with the second lateral section LS2 of the feeder 34. When the harvester 10 is off-row, at least part of the harvester 10 may be incorrectly aligned with the crop SC1. For instance, as shown in FIGS. 4A and 4B, a row spacing RS1 of the planted crop SC1 is different (e.g., larger) compared to a row spacing RS2 between heads HR1 of the header 32. In FIG. 4A, the spacings RS1, RS2 at the first lateral region LR1 of the header 32 are all substantially aligned along the direction of travel 21 such that the crop SC1 is received between the heads HR1 at the first lateral region LR1. Conversely, the spacings RS1, RS2 at the second lateral region LR2 of the header 32 are not all substantially aligned along the direction of travel 21, such that some of the crop SC1 passes largely under or outside of the heads HR1 within the second lateral region LR2. As shown in FIG. 4B, such as when the heading of the harvester 10 is shifted by a distance HS1 in the lateral direction LT1 relative to the crop SC1 from the position shown in FIG. 4A, the spacings RS1, RS2 at both the first and second lateral regions LR1, LR2 are substantially aligned along the direction of travel 21 and the harvester 10 is on-row. In one embodiment, a header actuator 32A (FIG. 5) may alternatively, or additionally, be controlled to adjust the spacing RS2 between the heads HR1 from the spacing in FIG. 4A such that the crop SC1 and the heads HR1 are substantially aligned along the direction of travel 21 within both the first and second lateral regions LR1, LR2 and the harvester 10 is on-row.

When the harvester 10 is off-row, the data generated by the sensors 102 indicative of the first and second flows of harvested materials F1, F2 through the feeder 34 may indicate that there is a significant difference in the flow of harvested materials through one lateral section (e.g., the first flow F1 through the first lateral section LS1) compared to the flow of harvested materials through another lateral section (e.g., the second flow F2 through the second lateral section LS2). For example, the second flow of harvested materials F2 may have more MOG than the first flow of harvested materials F1. Conversely, when the harvester 10 is on-row, the data generated by the sensors 102 indicative of the first and second flows F1, F2 of harvested materials through the feeder 34 may indicate that there is not a significant difference in the flow of harvested materials through one lateral section (e.g., the first flow F1 through the first lateral section LS1) compared to the flow of harvested materials through another lateral section (e.g., the second flow F2 through the second lateral section LS2). For instance, the first and second flows of harvested materials F1, F2 may have a substantially similar amount of MOG. Accordingly, by monitoring the comparison of the data generated by the sensors 102 indicative of the flows of harvested materials through the different lateral sections of the feeder 34, the disclosed system may be able to determine whether the harvester 10 is on-row, among other things.

Referring now to FIG. 5, a schematic view of one embodiment of a control system 200 for determining feeder throughput of a feeder of an agricultural harvester is illustrated in accordance with aspects of the present subject matter. In general, the control system 200 will be described herein with reference to the harvester 10 described with reference to FIG. 1, the feeder 34 and the sensor assembly 100 described with reference to FIGS. 2-3, and the header 32 described with reference to FIGS. 4A-4B. However, it should be appreciated that the disclosed control system 200 may be used with any suitable agricultural work vehicle having any other suitable vehicle configuration, with any feeder having any other suitable feeder configuration, with any sensor assembly having any other suitable sensor assembly configuration, and/or with any header having any other suitable header configuration.

As shown, the control system 200 may include any combination of components of the harvester 10 described above. For instance, the system 200 may include: drives, such as the shaft drive(s) 41 for rotationally driving the rotational shaft(s) 35A, 35B, the auger drive 47 for rotationally driving the auger 44, a drive of the fan(s) 52 for providing the air flow through the sieves 50 that removes chaff and other impurities from the crop material, and the rotor drive 76 for controlling a rotational speed of rotor 12; actuators, such as the header actuator(s) 32A for adjusting the row spacing RS2 of the heads HR1 of the header 32, and/or the concave actuator(s) 78A, 78B for controlling the position of the concave 46 and/or angle of vanes of the concave 46; the leveling system 80 for adjusting a position of the pans 48 and the sieves 50; and/or a steering system 90 configured to adjust a heading (e.g., the direction of travel 21) of the harvester 10. The system 200 may further include the sensor(s) 102 for generating data indicative of the flow of harvested materials through the feeder 34.

Moreover, as shown in FIG. 5, the control system 200 may include a computing system 202 installed on and/or otherwise provided in operative association with the harvester 10. In general, the computing system 202 may correspond to any suitable processor-based device(s), such as a computing device or any combination of computing devices. Thus, in several embodiments, the computing system 202 may include one or more processor(s) 204 and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 206 of the computing system 202 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the computing system 202 to perform various computer-implemented functions, such as one or more aspects of the control algorithms and/or methods described herein.

In one embodiment, the memory 206 of the computing system 202 may include one or more databases for storing information associated with the operation of the harvester 10, including data 208 associated with determining the feeder throughput of the feeder 34 of the harvester 10. For instance, as shown in FIG. 5, the memory 206 may include a sensor database 210 for storing data provided by the sensors 102 that is associated with at least an amount of the flow of harvested materials through the feeder 34. Specifically, the computing system 202 may be communicatively coupled to each of the sensors 102 to allow the data indicative of the harvested materials generated by the sensors 102 (e.g., indicative of the volume, composition, distribution, quality, etc.) to be transmitted to the computing system 202. As such, the computing system 202 may be configured to continuously or periodically monitor and store the data indicative of the amount/distribution of the harvested materials for subsequent processing and/or analysis.

Additionally, the memory 206 may include a guidance map database 212 configured to store a guidance map for guiding the harvester 10 through the field during a harvesting operation. For instance, the guidance map may provide a path for guiding or steering the harvester 10 through the field. The guidance map may be generated based at least in part on data collected during a previous agricultural operation within the field, such as a planting or spraying operation, and/or based on any other suitable information.

The memory 206 may store instructions 214 that, when executed by the processor(s) 204, configure the computing system 202 to execute a harvester control module 218. For instance, the control module 218 may be configured to control one or more components of the harvester 10. For example, the control module 218 may generally be configured to control an operation of the auger drive 47 to drive the auger 44 to direct crop material through the header 32 to the front end 36 of the feeder 34. Similarly, the control module 218 may generally be configured to control an operation of the shaft drive(s) 41 to drive the rotational shaft(s) 35A, 35B to direct crop material through the feeder 34. Additionally, in some embodiments, the control module 218 may control the steering system 90 to steer the harvester 10 through the field according to the guidance map 212 and/or control the user interface(s) 220 to display or otherwise indicate the path provided by the guidance map 212 to an operator.

The control module 218 may further be configured to initiate a control action to control component(s) of the harvester 10 based at least in part on the flow of harvested materials through the feeder 34. For instance, the control module 218 may determine the feeder throughput based at least in part on the sensor data 210. Generally, the greater the amount of harvested materials detected to be flowing through the feeder 34, the greater the feeder throughput. In some instances, the control module 218 may control the rotor drive 76 to adjust a rotational speed of the rotor 12, the concave actuator(s) 78A, 78B to adjust the concave 46 (e.g., a position of the concave 46 about the rotational axis of the rotor 12 and/or an angle of vanes of the concave 46), and/or the fan(s) 52 to adjust the air flow in response to the feeder throughput. For instance, in response to a change in the feeder throughput, the rotor drive 76 may be controlled to increase or decrease the rotational speed of the rotor 12; the first concave actuator(s) 78A may be controlled to move the concave 46 closer to the rotor 12 to increase an aggressiveness of the threshing and separating assembly; the second concave actuator(s) 78B may be controlled to change the degree of opening of the vanes of the concave 46 to create additional passes within the threshing and separating assembly; and/or the fan(s) 52 may be controlled to increase or decrease the air flow across the sieves 50.

Moreover, in some embodiments, the control module 218 may be configured to determine the distribution of the harvested materials across the lateral width of the feeder 34 based at least in part on the sensor data 210. For instance, the field of view of the sensor(s) 102 may be correlated to the lateral width of the feeder 34 such that the distribution of the harvested materials across all or a portion of the lateral width of the feeder 34 may be determined based at least in part on the sensor data 210. More particularly, as discussed above, the data generated by the sensor(s) 102 may be indicative of the separate flows of harvested materials through different lateral sections of the feeder 34. For example, the sensor(s) 102 may be configured to generate data indicative of the first flow of harvested materials F1 through the first lateral section LS1 and data indicative of the second flow of harvested materials F2 through the second lateral LS2. Additionally, in some embodiments, the composition (e.g., percentage of crop, percentage of MOG, and/or the like), the size of stalks (e.g., stalk thickness), and/or the quality of the harvested crop (e.g., percentage of cracked kernels, the size of crop (e.g., ear size), and/or the like) in the flow(s) of harvested materials may be determined based at least in part on the sensor data 210.

The control module 218 may be configured to control an operation of the leveling system 80 to adjust a positioning of the pans 48 and/or sieves 50 of the cleaning assembly in response to the distribution of harvested materials indicating that the flow of crop material is being focused towards one of the lateral sides of the feeder 34. For instance, if more crop material is detected toward the first lateral side L1 of the feeder 34, the leveling system 80 may be controlled to tilt the pans 48 and/or sieves 50 of the cleaning assembly such that the lateral side of the cleaning assembly proximate the first lateral side L1 of the feeder 34 is raised and/or the lateral side of the cleaning assembly proximate the second lateral side L2 of the feeder 34 is lowered. Conversely, if more crop material is detected toward the second lateral side L2 of the feeder 34, the leveling system 80 may be controlled to tilt the pans 48 and/or sieves 50 of the cleaning assembly such that the lateral side of the cleaning assembly proximate the second lateral side L2 of the feeder 34 is raised and/or the lateral side of the cleaning assembly proximate the first lateral side L1 of the feeder 34 is lowered.

The control module 218 may further determine whether the harvester 10 is on-row based at least in part on the feeder throughput. For instance, the control module 218 may compare the different flows of harvested materials F1, F2 based at least in part on the sensor data 210 to determine whether the harvester 10 is on-row. For example, the control module 218 may compare the first flow of harvested materials F1 to the second flow of harvested materials F2 based at least in part on the sensor data 210. In some instances, the control module 218 may compare the first volume of MOG in the first flow of harvested materials F1 to a second volume of MOG in the second flow of harvested materials F2, with the first and second volumes being determined based at least in part on the sensor data 210. When the first volume of MOG is greater than the second volume of MOG by at least a threshold amount, the control module 218 is configured to determine that the harvester 10 is off-row, particularly that the first lateral side L1 of the harvester 10 associated with the first lateral section LS1 is off-row. Similarly, when the second volume of MOG is greater than the first volume of MOG by at least the threshold amount, the control module 218 is configured to determine that the harvester 10 is off-row, particularly that the second lateral side L2 of the harvester 10 associated with the second lateral section LS2 is off-row. If the difference between the first and second volumes of MOG is less than or within the threshold amount, the control module 218 is configured to determine that the harvester 10 is on-row.

Moreover, the control module 218 may be configured to initiate a control an operation of the crop processing system to reduce crop losses and/or improve efficiency of the harvester 10 based at least in part on the determination of whether the feeder 34 is on-row. For instance, when the harvester 10 is determined to not be on-row or to be off-row, the control module 218 may control a steering system 90 of the harvester 10 to adjust the heading of the harvester 10 and/or control the header actuator 32A to adjust the row spacing RS2 of the header 32 to bring the harvester 10 back on-row. Additionally, the control module 218 may adjust the header 32 (e.g., the row spacing of the header 32, the height of the header, and/or the like) based on the size of stalks (e.g., stalk thickness), and/or the quality of the harvested crop (e.g., percentage of cracked kernels, the size of crop (e.g., ear size), and/or the like) in the flow(s) of harvested materials F1, F2 detected within the feeder 34 based at least in part on the sensor data 210.

In some instances, the control module 218 may further monitor whether the adjustment of the harvester 10 moved the harvester 10 on-row. For instance, the control module 218 may compare the different flows of harvested materials F1, F2 based at least in part on the sensor data 210 generated after the adjustment of the harvester 10 to determine whether the harvester 10 is now on-row. For example, the control module 218 may compare the first flow of harvested materials F1 to the second flow of harvested materials F2 based at least in part on the sensor data 210 generated after the adjustment of the harvester 10, similar to as described above. If the control module 218 determines that the adjustments did not bring the harvester on-row or that the harvester 10 is still off-row, then the control module 218 may, in some instances, initiate further control of the operation of the crop processing system to reduce crop losses and/or improve efficiency of the harvester 10 based at least in part on the determination of whether the feeder 34 is on-row. For instance, when the harvester 10 is determined to still not be on-row or to be off-row, the control module 218 may control a steering system 90 of the harvester 10 to further adjust the heading of the harvester 10 and/or control the header actuator 32A to further adjust the row spacing RS2 of the header 32 to bring the harvester 10 back on-row. The control module 218 may additionally, or alternatively, notify an operator that the harvester 10 is still off-row and/or that the header 32 may be plugged.

In some instances, the control module 218 may instead or additionally determine that the header 32 may be at least partially plugged based on the comparison of the flows of harvested materials F1, F2. For example, if the volume of the first flow of harvested materials F1 is less than a volume of the second flow of harvested materials F2 by at least a given differential, then the control module 218 may determine that the first lateral side L1 of the harvester 10 associated with the first lateral section LS1 is plugged. In such instance, the control module 218 may adjust the row spacing RS2 of the header 32 to try to clear the plug (e.g., cyclically widen and narrow the row spacing RS2 along at least the plugged side of the header 32) and/or may indicate the plugged side of the header 32 to an operator.

It should be appreciated that the automated control of the different parts of the harvester 10 in response to the distribution of the crop may additionally take into account further operating factors of the harvester 10, such as crop type, moisture content, and/or the like.

Alternatively, or additionally, in some embodiments, the harvester control module 218 may be configured to control an operation of a user interface 220 associated with the agricultural harvester 10. In general, the user interface 220 may correspond to any suitable input device(s) configured to allow the operator to provide operator inputs to the computing system 202, such as a touch screen display, a keyboard, joystick, buttons, knobs, switches, and/or combinations thereof located within the cab 22 of the harvester 10. The operator may provide various inputs into the system 202 via the user interface 220. In one embodiment, suitable operator inputs may include, but are not limited to, a target rotor speed, a target concave position and/or vane angle, a lateral leveling of the cleaning assembly, and/or any other parameter associated with the harvester 10. In addition, the user interface 220 may also be configured to provide feedback (e.g., feedback associated with the feeder throughput) to the operator. As such, the user interface 220 may include one or more output devices (not shown), such as display screens, speakers, warning lights, and/or the like, which are configured to provide feedback from the computing system 202 to the operator. For example, the computing system 202 may control an operation of the user interface 220 to indicate to the operator of the harvester 10 the feeder throughput, the distribution of the crop materials across the lateral direction LT1 moving through the feeder 34, the composition of the harvested materials, the quality of the harvested materials, whether the harvester is on-row or off-row, and/or suggested actions to reduce crop loss and/or improve efficiency based on the feeder throughput, distribution, composition, quality of the crop materials moving through the feeder 34, and/or the on-row or off-row condition of the harvester 10.

The instructions 214, when executed by the processor(s) 204, may further configure the computing system 202 to execute a map module 222. In general, the map module 222 may be configured to correlate the feeder throughput, or a parameter related to feeder throughput (e.g., yield, residue coverage, and/or the like), to different locations within the field. For instance, the computing system 202 may also be communicatively coupled with one or more positioning device(s) 224, such as a Global Positioning System (GPS) or another similar positioning device, configured to transmit a location corresponding to a position of the harvester 10 (e.g., of the feeder 34) within the field when the sensor data 210 is generated by the sensor(s) 102. The map module 222 may generate a feeder throughput map, a yield map, a residue coverage map, and/or the like, correlating the feeder throughput (or related parameter) to each position of the harvester 10 associated with each data point of the sensor data. The generated map(s) may be used to control subsequent agricultural operations within the field (e.g., tillage, planting, and/or the like).

Additionally, the map module 222 may be configured to adjust or update the guidance map 212 based at least in part on the feeder throughput. For instance, if the harvester 10 is determined to be off-row, the map module 222 may adjust the guidance map 212 to reflect an adjustment to bring the harvester 10 back on-row. For example, the first lateral side L1 of the harvester 10 (e.g., the first lateral region LR1 of the header 32) is determined to be off-row, but the second lateral side L2 of the harvester 10 (e.g., the second lateral region LR2 of the header 32) is determined to be on-row, then the map module 222 may shift the path of the guidance map 212 to shift the first lateral side L1 towards the on-row condition (e.g., left).

It should be appreciated that the computing system 202 may also include various other suitable components, such as a communications circuit or module 226, a network interface, one or more input/output channels, a data/control bus and/or the like, to allow the computing system 202 to be communicatively coupled with any of the various other system components described herein.

Additionally, it should be appreciated that, in some embodiments, the computing system 202 is a feeder computing system configured to control operation of the feeder 34. In such embodiments, the feeder computing system 202 may be communicatively coupled to a main computing system 203 of the harvester 10 configured to control the operation of the crop processing system, trailing the feeder 34, such as the operation of the rotor drive 76, the concave actuator(s) 78A, 78B, the fan(s) 52, and the leveling system 80, and, optionally, the user interface 220. The feeder computing system 202 and the main computing system 203 may be communicatively coupled in any suitable way. The feeder computing system 202 may be configured to receive the sensor data 210 from the sensors 102 and determine the feeder throughput. In some embodiments, the feeder computing system 202 may then communicate the feeder throughput to the main computing system 203, where the main computing system 203 may subsequently control the operation of the crop processing system and/or user interface 220 based at least in part on the feeder throughput as suggested above with reference to the harvester control module 218. Alternatively, or additionally, the feeder computing system 202 may control the operation of the crop processing system and/or user interface 220 via communication with the main computing system 203. It should be appreciated that by using the feeder computing system 202, the data processing load on the main computing system 203 may be reduced. It should additionally be appreciated that, due to the distance between the feeder 34 and the main computing system 203, it is easier to couple (e.g., with wires or wirelessly) the sensors 102 to the feeder computing system 202 and to couple (e.g., with wires or wirelessly) the computing systems 202, 203 than to couple (e.g., with wires or wirelessly) the sensors 102 directly to the main computing system 203.

Figure 6:
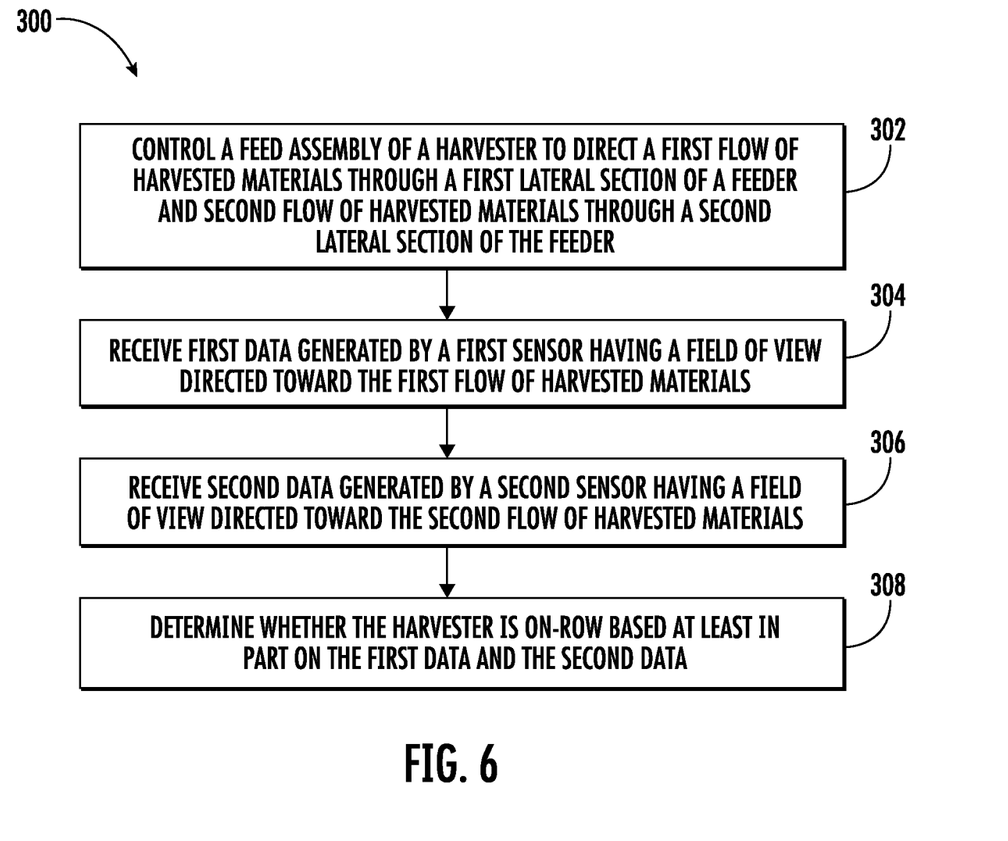
FIG. 6 illustrates a flow diagram of one embodiment of a method for monitoring a throughput of a feeder for use with an agricultural harvester in accordance with aspects of the present subject matter.

Referring now to FIG. 6, a flow diagram of one embodiment of a method 300 for determining feeder throughput of an agricultural harvester (e.g., harvester 10) is illustrated in accordance with aspects of the present subject matter. For purposes of discussion, the method 300 will generally be described herein with reference to the harvester 10 described with reference to FIG. 1, the sensor(s) 102 described with reference to the feeder 34 in FIGS. 2-3, and the computing system 202 described with reference to FIG. 5. However, it should be appreciated that the disclosed method 300 may be used with any suitable agricultural work vehicle having any other suitable vehicle configuration, with a computing system having any other suitable system configuration, with any feeder having any other suitable feeder configuration, and/or with any other suitable sensor(s). Additionally, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 includes controlling a feed assembly of a harvester to direct a first flow of harvested materials through a first lateral section of a feeder and a second flow of harvested materials through a second lateral section of the feeder. For instance, as described above, the feed assembly 35 (e.g., the shaft drive(s) 41 of the feed assembly 35) may be controlled to drive the plurality of slats 37 about the loop defined by the chain 39 to direct the first flow of harvested materials F1 through the first lateral section LS1 of the feeder 34 and the second flow of harvested materials F2 through the second lateral section LS2 of the feeder 34, where the second lateral section LS2 is at least partially separate from the first lateral section LS1 along a lateral direction LT1.

Further, at (304), the method 300 includes receiving first data generated by a first sensor having a field of view directed toward the first flow of harvested materials. For example, as discussed above, the computing system 202 may receive first data generated by the sensor 102 having a field of view 102F directed toward the first flow of harvested materials F1.

Moreover, at (306), the method 300 includes receiving second data generated by a second sensor having a field of view directed toward the second flow of harvested materials. For example, as discussed above, the computing system 202 may receive second data generated by the sensor 102 having a field of view 102F directed toward the second flow of harvested materials F2.

Additionally, at (308), the method 300 includes determining whether the harvester is on-row based at least in part on the first data and the second data. For instance, as described above, the computing system 202 may determine whether the harvester 10 is on-row based at least in part on the first data and the second data. For example, if the volume of MOG in the first flow of harvested materials F1 is greater than the volume of MOG in the second flow of harvested materials F2 by at least a threshold volume, the computing system 202 may determine that the harvester 10 is off-row, particularly that the first lateral side L1 of the harvester 10 associated with the first lateral section LS1 of the feeder 34 is more off-row (less on-row) than the second lateral side L2 of the harvester 10 associated with the second lateral section LS2 of the feeder 34. However, if the volume of MOG in the first flow of harvested materials F1 is within the threshold volume of the volume of MOG in the second flow of harvested materials F2, the computing system 202 may determine that the harvester 10 is on-row.

It is to be understood that the steps of the method 300 are performed by the computing system 202 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 202 described herein, such as the method 300, is implemented in software code or instructions which are tangibly stored on a tangible computer readable medium. The computing system 202 loads the software code or instructions via a direct interface with the computer readable medium or via a wired and/or wireless network. Upon loading and executing such software code or instructions by the computing system 202, the computing system 202 may perform any of the functionality of the computing system 202 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An agricultural system for monitoring throughput of a feeder configured for use with a harvester performing a harvesting operation within a field, the agricultural system comprising:
    a feeder housing;
    a feed assembly supported within the feeder housing, the feed assembly configured to direct a first flow of harvested materials and a second flow of harvested materials through the feeder;
    a first sensor configured to generate first data indicative of the first flow of harvested materials through a first lateral section of the feeder;
    a second sensor configured to generate second data indicative of the second flow of harvested materials through a second lateral section of the feeder, the second lateral section of the feeder being at least partially separate from the first lateral section of the feeder; and
    one or more processors communicatively coupled to the first sensor and the second sensor, the one or more processors being configured to:
        receive the first data and the second data; and
        determine whether the harvester is on-row or off-row based at least in part on the first data and the second data;

wherein the harvester is on-row when row spacing across a header of the harvester is aligned with spacing of rows of crop in a field being harvested, such that the rows of crop are aligned with the header and all pass through corresponding spaces of the header, and wherein the harvester is off-row when row spacing across at least part of the harvester is not aligned with the spacing of the rows of crop in the field being harvested, such that one or more of the rows of crop aligned with the header do not pass through the corresponding spaces of the header.

2. The agricultural system of claim 1, wherein the one or more processors are configured to determine whether the harvester is on-row based at least in part on a comparison of the first flow of harvested materials through the first lateral section to the second flow of harvested materials through the second lateral section determined based at least in part on the first data and the second data.

3. The agricultural system of claim 2, wherein the comparison of the first flow of harvested materials and the second flow of harvested materials comprises comparing a first volume of material other than grain (MOG) in the first flow of harvested materials through the first lateral section to a second volume of MOG in the second flow of harvested materials through the second lateral section determined based at least in part on the first data and the second data.

4. The agricultural system of claim 3,
wherein, when the first volume of MOG is greater than the second volume of MOG by at least a threshold amount, the one or more processors are configured to determine that the harvester is off-row.

5. The agricultural system of claim 1, wherein the one or more processors are configured to initiate a control action based at least in part on the determination of whether the harvester is on-row.

6. The agricultural system of claim 5, wherein the control action comprises controlling an operation of a user interface to indicate whether the harvester is on-row.

7. The agricultural system of claim 5, wherein the control action comprises adjusting a heading of the harvester when the harvester is determined to be off-row.

8. The agricultural system of claim 1, wherein the one or more processors are further configured to receive a guidance map for performing the harvesting operation within the field, the one or more processors being configured to update the guidance map when the harvester is determined to be off-row.

9. The agricultural system of claim 1, wherein the first sensor and the second sensor comprise at least one of a camera, a radar sensor, or a lidar sensor.

10. The agricultural system of claim 1, wherein the first sensor and the second sensor are supported on a lower wall of the feeder housing, the first sensor having a field of view directed upwardly towards the first flow of harvested materials, and the second sensor having a field of view directed upwardly towards the second flow of harvested materials.

11. An agricultural method for monitoring throughput of a feeder configured for use with a harvester performing a harvesting operation within a field, the feeder comprising a feeder housing and a feed assembly supported within the feeder housing, the agricultural method comprising:

directing, via controlling a feed assembly, a first flow of harvested materials through a first lateral section of the feeder and a second flow of harvested materials through a second lateral section of the feeder, the second lateral section being at least partially separate from the first lateral section along a lateral direction;

receiving, with one or more processors, first data generated by a first sensor having a field of view directed toward the first flow of harvested materials;

receiving, with the one or more processors, second data generated by a second sensor having a field of view directed toward the second flow of harvested materials; and determining, with the one or more processors, whether the harvester is on-row or off-row based at least in part on the first data and the second data;

wherein the harvester is on-row when row spacing across a header of the harvester is aligned with spacing of rows of crop in a field being harvested, such that the rows of crop are aligned with the header and all pass through corresponding spaces of the header, and wherein the harvester is off-row when row spacing across at least part of the harvester is not aligned with the spacing of the rows of crop in the field being harvested, such that one or more of the rows of crop aligned with the header do not pass through the corresponding spaces of the header.

12. The agricultural method of claim 11, wherein determining whether the harvester is on-row comprises comparing the first flow of harvested materials through the first lateral section to the second flow of harvested materials through the second lateral section based at least in part on the first data and the second data.

13. The agricultural method of claim 12, wherein comparing the first flow of harvested materials and the second flow of harvested materials comprises comparing a first volume of material other than grain (MOG) in the first flow of harvested materials through the first lateral section to a second volume of MOG in the second flow of harvested materials through the second lateral section based at least in part on the first data and the second data.

14. The agricultural method of claim 13, wherein determining whether the harvester is on-row comprises determining that the harvester is on-row when the first volume of MOG is within a threshold amount of the second volume of MOG and that the harvester is off-row when the first volume of MOG is greater than the second volume of MOG by at least a threshold amount.

15. The agricultural method of claim 11, further comprising controlling an operation of a user interface to indicate whether the harvester is on-row.

16. The agricultural method of claim 11, further comprising adjusting a heading of the harvester when the harvester is determined to be off-row.

17. The agricultural method of claim 11, further comprising:

receiving, with the one or more processors, a guidance map for performing the harvesting operation within the field, and updating, with the one or more processors, the guidance map when the harvester is determined to be off-row.

18. The agricultural method of claim 11, wherein the first sensor and the second sensor comprise at least one of a camera, a radar sensor, or a lidar sensor.

19. The agricultural method of claim 11, wherein the first sensor and the second sensor are supported on a lower wall of the feeder housing, the first sensor having a field of view directed upwardly towards the first flow of harvested materials, and the second sensor having a field of view directed upwardly towards the second flow of harvested materials.

* * * * *